US012633587B2

(12) United States Patent
Schmitt et al.

(10) Patent No.: US 12,633,587 B2
(45) Date of Patent: May 19, 2026

(54) BATTERY MODULE AND METHOD FOR PRODUCING SUCH A BATTERY MODULE

(71) Applicant: Robert Bosch GmbH, Stuttgart (DE)

(72) Inventors: Markus Schmitt, Tamm (DE); Holger Knesch, Ludwigsburg (DE); Roman Marx, Moensheim (DE)

(73) Assignee: Robert Bosch GmbH, Stuttgart (DE)

( * ) Notice: Subject to any disclaimer, the term of this patent is extended or adjusted under 35 U.S.C. 154(b) by 598 days.

(21) Appl. No.: 17/861,294

(22) Filed: Jul. 11, 2022

(65) Prior Publication Data

US 2023/0022636 A1 Jan. 26, 2023

(30) Foreign Application Priority Data

Jul. 13, 2021 (DE) ..................... 10 2021 207 407.3

(51) Int. Cl.
H01M 10/613 (2014.01)
H01M 10/0525 (2010.01)
(Continued)

(52) U.S. Cl.
CPC ..... H01M 10/613 (2015.04); H01M 10/0525 (2013.01); H01M 10/647 (2015.04);
(Continued)

(58) Field of Classification Search
CPC ........... H01M 10/613; H01M 10/0525; H01M 10/647; H01M 10/653; H01M 10/6554;
(Continued)

(56) References Cited

U.S. PATENT DOCUMENTS

| | | | |
|---|---|---|---|
| 10,186,697 B1 * | 1/2019 | Harris, III | H01M 50/213 |
| 2009/0239137 A1 * | 9/2009 | Kakuchi | H01M 50/271 |
| | | | 429/151 |

(Continued)

FOREIGN PATENT DOCUMENTS

| | | |
|---|---|---|
| DE | 102011076580 A1 | 11/2012 |
| DE | 102012223566 A1 | 6/2014 |

(Continued)

OTHER PUBLICATIONS

DE-102015217630-A1 translation (Year: 2017).*

(Continued)

*Primary Examiner* — Nicholas A Smith
*Assistant Examiner* — Seamus Patrick McNulty
(74) *Attorney, Agent, or Firm* — Michael Best & Friedrich LLP

(57) ABSTRACT

A battery module having a plurality of prismatic battery cells, in particular lithium-ion battery cells, which are arranged next to one another in a longitudinal direction of the battery module and furthermore a first temperature-control element is thermally conductively connected to in each case one side surface of the plurality of battery cells, and wherein the plurality of battery cells are received in an interior of a housing of the battery module and additionally a bottom surface of the housing of the battery module and a bottom surface of the battery cells are respectively cohesively connected to one another, the housing comprises a second temperature-control element directly adjacent to the bottom surfaces of the plurality of battery cells, and a compressing element and/or a supporting element is arranged between the housing and the plurality of battery cells in the longitudinal direction of the battery module.

16 Claims, 8 Drawing Sheets

(51) Int. Cl.

| | |
|---|---|
| *H01M 10/647* | (2014.01) |
| *H01M 10/653* | (2014.01) |
| *H01M 10/6554* | (2014.01) |
| *H01M 10/6556* | (2014.01) |

(52) U.S. Cl.
CPC ..... *H01M 10/653* (2015.04); *H01M 10/6554* (2015.04); *H01M 10/6556* (2015.04)

(58) Field of Classification Search
CPC ........... H01M 10/6556; H01M 10/658; H01M 50/264; H01M 50/293; H01M 50/209; H01M 10/058; H01M 10/615; H01M 10/655; Y02E 60/10
See application file for complete search history.

(56) References Cited

U.S. PATENT DOCUMENTS

| | | | |
|---|---|---|---|
| 2011/0027630 A1 | 2/2011 | Tsutsumi et al. | |
| 2011/0293973 A1* | 12/2011 | Kim .................... | H01M 50/271 |
| | | | 429/163 |
| 2013/0059190 A1* | 3/2013 | Kossakovski ....... | H01M 10/486 |
| | | | 165/61 |
| 2014/0087231 A1 | 3/2014 | Schaefer et al. | |
| 2014/0266066 A1 | 9/2014 | Turon Teixidor et al. | |
| 2015/0037616 A1* | 2/2015 | Wyatt ................. | H01M 10/613 |
| | | | 429/153 |
| 2016/0149180 A1 | 5/2016 | Tokoo et al. | |
| 2016/0301117 A1 | 10/2016 | Tyler et al. | |
| 2017/0170510 A1 | 6/2017 | Turon Teixidor et al. | |
| 2018/0138563 A1* | 5/2018 | Behm ............... | H01M 10/0481 |
| 2019/0044113 A1 | 2/2019 | Wagner et al. | |
| 2020/0112072 A1 | 4/2020 | Schmitt | |
| 2020/0127257 A1* | 4/2020 | Lee ................... | H01M 10/0481 |
| 2020/0203784 A1* | 6/2020 | Shimizu ............ | H01M 10/6555 |
| 2020/0388844 A1* | 12/2020 | Richey .................... | H01M 4/96 |
| 2021/0005856 A1* | 1/2021 | Norimine ........... | H01M 50/264 |
| 2021/0226275 A1 | 7/2021 | Enkirch et al. | |
| 2021/0351454 A1* | 11/2021 | Vizzini ............. | H01M 10/6551 |
| 2022/0093991 A1* | 3/2022 | Cournoyer .......... | H01M 50/262 |
| 2023/0018065 A1 | 1/2023 | Schmitt et al. | |
| 2023/0018957 A1 | 1/2023 | Schmitt et al. | |
| 2023/0020447 A1 | 1/2023 | Schmitt | |

FOREIGN PATENT DOCUMENTS

| | | | |
|---|---|---|---|
| DE | 102013201021 A1 | | 7/2014 |
| DE | 102014218330 A1 | | 3/2016 |
| DE | 102015214185 A1 | | 2/2017 |
| DE | 102015217630 A1 | * | 3/2017 |
| DE | 102017219556 A1 | | 5/2019 |
| DE | 102018205896 A1 | | 10/2019 |
| DE | 102019006234 A1 | | 3/2021 |
| DE | 102019215006 A1 | | 4/2021 |
| DE | 102019215636 A1 | | 4/2021 |
| EP | 2324526 A1 | | 5/2011 |
| EP | 2360768 A1 | | 8/2011 |
| EP | 3694036 A1 | | 8/2020 |
| EP | 3723156 A1 | | 10/2020 |
| JP | H06188023 A | | 7/1994 |
| JP | 2016085895 A | | 5/2016 |
| JP | 2016204255 A | | 12/2016 |
| KR | 100739841 B1 | | 7/2007 |
| WO | 2014072119 A1 | | 5/2014 |
| WO | 2019221376 A1 | | 11/2019 |

OTHER PUBLICATIONS

Non-final Office Action issued by the U.S. Patent Office for U.S. Appl. No. 17/860,727 dated Mar. 27, 2025 (16 pages).

Non-final Office Action issued by the U.S. Patent Office for U.S. Appl. No. 17/861,295 dated Mar. 27, 2025 (29 pages).

Non-final Office Action issued by the U.S. Patent Office for U.S. Appl. No. 17/860,683 dated Mar. 11, 2025 (25 pages).

Final Office Action issued by the U.S. Patent Office for U.S. Appl. No. 17/860,683 dated Aug. 12, 2025 (22 pages).

Final Office Action issued by the U.S. Patent Office for U.S. Appl. No. 17/860,727 dated Aug. 7, 2025 (13 pages).

Final Office Action issued by the U.S. Patent Office for U.S. Appl. No. 17/861,295 dated Oct. 2, 2025 (27 pages).

Non-final Office Action issued by the U.S. Patent Office for U.S. Appl. No. 17/861,295 dated Jan. 12, 2026 (30 pages).

Non-final Office Action issued by the U.S. Patent Office for U.S. Appl. No. 17/860,683 dated Nov. 26, 2025 (24 pages).

Notice of Allowance issued by the U.S. Patent Office for U.S. Appl. No. 17/860,727 dated Dec. 9, 2025 (12 pages).

Non-final Office Action issued by the U.S. Patent Office for U.S. Appl. No. 17/860,727 dated Jan. 28, 2026 (18 pages).

* cited by examiner

BATTERY MODULE AND METHOD FOR PRODUCING SUCH A BATTERY MODULE

BACKGROUND

The invention relates to a battery module. The present invention also relates to a method for producing such a battery module.

It is known from the prior art that a battery module has a plurality of individual battery cells which each have a positive voltage tap and a negative voltage tap, wherein, for the purpose of electrically conductively connecting the plurality of battery cells to one another in series and/or in parallel, the respective voltage taps are electrically conductively connected to one another and therefore can be interconnected to form the battery module. Battery modules, for their part, are further interconnected to form batteries or to form entire battery systems.

In particular, lithium-ion battery cells or lithium-polymer battery cells heat up as a result of chemical conversion processes in their interior, particularly in the case of rapid energy release or absorption in battery systems. The more powerful the battery system, the more it is heated up and consequently an efficient active thermal management system is required.

Temperature control is primarily in the form of liquid temperature control, for example using a water/glycol mixture. The temperature-control fluid is conducted, for example, through ducts in a cooling element arranged below the battery cells. In addition, these cooling elements are connected to a cooling circuit.

In addition, it is known from the prior art in this respect to remove heat from the battery cells via their cell bottoms, wherein the flow of heat passes through the bottom of the cell housing and a cooling plate into the cooling medium. Thermal contact-connection between the cell bottom and the cooling element is implemented by means of what is known as a thermal interface material (TIM), this possibly being, for example, a thermally conductive adhesive, what is known as a gap filler or what is known as a gap pad.

Prior art documents in this respect include, for example, EP 2 360 768, KR 100 739 841, US 2017/0170510 or JP 2016/0085895.

SUMMARY

A battery module having the features of the independent claim offers the advantage that reliable temperature control of a plurality of battery cells over the service life thereof is provided overall.

According to the invention, a battery module having a plurality of prismatic battery cells, which are in the form of lithium-ion battery cells in particular, is provided for this purpose. Here, the battery cells are arranged next to one another in a longitudinal direction of the battery module. In addition, a first temperature-control element is thermally conductively connected to in each case one side surface of the plurality of battery cells. Furthermore, the plurality of battery cells are received in an interior of a housing of the battery module. In addition, a bottom surface of the housing of the battery module and a bottom surface of the battery cells are respectively cohesively connected to one another. In particular, this connection is formed in an adhesively bonded manner by means of an adhesive which can preferably contain thermally conductive additives. Furthermore, the housing comprises a second temperature-control element directly adjacent to the bottom surfaces of the plurality of battery cells. A compressing element and/or a supporting element is arranged between the housing of the battery module and the plurality of battery cells in the longitudinal direction of the battery module.

Advantageous developments of and improvements to the apparatus specified in the independent claim are possible owing to the measures set out in the dependent claims.

At this point, it should be noted that prismatic battery cells each comprise a battery cell housing with a total of six side surfaces, pairs of which are arranged opposite and substantially parallel to one another. Furthermore, side surfaces arranged adjacent to one another are arranged at a right angle to one another. The electrochemical components of the respective battery cell are received in an interior of the battery cell housing. Usually, two voltage taps, such as a positive voltage tap and a negative voltage tap in particular, are arranged on an upper side surface, referred to as the top surface. The lower side surface arranged opposite the upper side surface is referred to as the bottom surface.

In the case of arrangement of the battery cells next to one another in a longitudinal direction of the battery module, the battery cells are arranged adjacent to one another by way of their respectively largest side surfaces, which are each arranged in particular a right angle to the upper side surface and the lower side surface. At this point, it should be noted that the longitudinal direction of the battery module is accordingly arranged perpendicularly to the largest side surfaces of the battery cells in this case.

At this point, it should be noted that, in order to form a cohesive connection formed in an adhesively bonded manner between the bottom surface of the housing of the battery module and the bottom surface of the battery cells by means of an adhesive, either preferably initially the adhesive can be dispensed into the housing of the battery module or onto the bottom surface of the housing of the battery module and/or the adhesive can also be dispensed onto the respective battery cell. Here, the cohesive connection formed in an adhesively bonded manner serves firstly to improve the conduction of heat between the bottom surface of the battery cell and the bottom surface of the housing and secondly for mechanical load transfer.

It is advantageous when the first temperature-control element is in the form of an electrical temperature-control element. For example, the electrical temperature-control element can be in the form of an electrical heater. In particular, the first temperature-control element can preferably be in the form of a heating mat.

At this point, it should be noted that the first temperature-control element is, in particular, in the form of a heating element and the second temperature-control element is in the form of a cooling element. As a result, heat can be removed from the plurality of battery cells and the plurality of battery cells can be heated up separately and as a result said processes can be comparably more efficient overall.

It is expedient when the compressing element tapers perpendicularly to the longitudinal direction of the battery module in the direction of the bottom surface of the housing of the battery module. As a result, reliable mechanical compression can be provided.

In particular, it is also expedient when the compressing element has two contact surfaces. Here, a first of the two contact surfaces is arranged, in particular, so as to make mechanical contact with the housing of the battery module, and a second of the two contact surfaces is arranged here, in particular, so as to make mechanical contact with a battery cell, arranged at an end, of the plurality of battery cells or an end plate described further below. Here, the two contact surfaces are preferably arranged at an angle of at least four degrees with respect to one another. Here, the contact surfaces are furthermore designed, in particular, with such dimensions that thermal decoupling between the housing and the plurality of battery cells is ensured. In particular, the contact surfaces should be designed here with such a size that, at the beginning of the service life, reliable contact and positioning of the plurality of battery cells in the housing of the battery module are achieved until the thermally conductive adhesive cures, and that swelling forces, which are produced at the end of the service life, of the plurality of battery cells can be reliably transferred to the housing of the battery module, without the compressing element itself being mechanically damaged. Furthermore, the compressing element serves to compensate for both tolerances of the housing and of the plurality of battery cells. In order to ensure this, the compressing element is inserted in the vertical direction of the battery module in the direction of the bottom surface of the housing of the battery module, in particular until defined compression of the plurality of battery cells is formed.

It is advantageous when the compressing element is received in a form-fitting manner in a receptacle of the housing of the battery module. As a result, reliable fastening of the compressing element can be formed. In particular, the receptacle preferably forms an angle of at least four degrees with respect to a vertical direction of the battery module arranged perpendicularly to the longitudinal direction. As a result, the process of receiving the compressing element can be simplified. At this point, it should be noted that the receptacle forms a further contact surface on which, in particular, the first of the two contact surfaces of the compressing element is arranged so as to make mechanical contact. In particular, even this contact surface preferably forms the angle of at least four degrees with respect to the vertical direction of the battery module arranged perpendicularly to the longitudinal direction. The compressing element is particularly preferably arranged so as to make linear contact with the housing or the receptacle of the housing, so that undesired secondary thermal paths, yet to be described, are minimized.

At this point, it should be noted that the housing of the battery module is preferably designed in the form of die-cast components, for example from a metal material.

According to a preferred embodiment of the invention, a supporting element is arranged opposite the compressing element in the longitudinal direction of the battery module. Here, the supporting element is arranged between the housing of the battery module and the plurality of battery cells. In particular, the supporting element is arranged between the housing and a battery cell, arranged at an end, of the plurality of battery cells or an end plate, yet to be described below.

The supporting element preferably has an opening and contact surfaces. In particular, the supporting element has first contact surfaces, which are formed to make mechanical contact with the housing of the battery module, and second contact surfaces, which are formed to make mechanical contact with a battery cell, arranged at an end, of the plurality of battery cells or an end plate yet to be described below. Owing to the design with an opening, comparably small contact surfaces can be formed for establishing mechanical contact between the battery cell arranged at an end or the end plate yet to be described and the housing, as a result of which thermal decoupling is ensured. In particular, the contact surfaces should be designed with such a size that, at the beginning of the service life, reliable contact and positioning of the plurality of battery cells in the housing of the battery module are achieved until the thermally conductive adhesive cures, and that swelling forces, which are produced at the end of the service life, of the plurality of battery cells can be reliably transferred to the housing of the battery module, without the compressing element itself being mechanically damaged. The supporting element is particularly preferably formed from a polymeric material, such as in the form of a plastic injection-molded part for example.

At this point, it should additionally be noted that the supporting element is designed in such a way that tolerances between the housing of the battery module and the plurality of battery cells can be reliably compensated for.

It is particularly expedient when the battery module has two compressing elements. Here, the two compressing elements are arranged at the same end of the plurality of battery cells. This offers the particular advantage that even better compensation is possible, wherein the two compressing elements can be reliably arranged in particular independently of one another and in each case autonomously. For example, the two compressing elements can be inserted to different extents. In addition, swelling forces, which are produced as a result, of the battery cells can be uniformly transferred to the housing of the battery module via the two compressing elements, as a result of which reaction forces which are produced in different ways on one side can be avoided. Furthermore, reliable thermal insulation can be formed as a result.

In particular, the second temperature-control element is in the form of a temperature-control chamber through which temperature-control fluid can flow. At this point, it should be noted that the second temperature-control element is preferably in the form of a cooling element. For example, the housing of the battery module can have an integrated temperature-control chamber for this purpose. In a preferred embodiment, the plurality of battery cells is thermally conductively connected to the bottom surface of the housing in particular by means of a thermally conductive adhesive, as a result of which heat can be transferred from the bottom surface of the respective battery cell to the second temperature-control element. The thermally conductive adhesive therefore serves to establish thermal contact between the second temperature-control element and the plurality of battery cells. As a result, the first primary thermal path is formed during temperature control of the plurality of battery cells.

The plurality of battery cells are particularly preferably braced with one another.

The plurality of battery cells are preferably arranged between two end plates in this case. At this point, it should be noted that the battery cells arranged opposite in the longitudinal direction of the battery module and at an end are respectively arranged adjacent to one of the two end plates. The two end plates are braced with one another by means of at least one clamping element. In particular, the clamping element is in the form of a clamping band. Here, the at least one clamping element is preferably cohesively connected to the end plates. For example, this connection can preferably be formed in a welded manner. The battery module particularly preferably comprises two clamping elements which are each preferably in the form of a clamping band and/or which are arranged opposite one another on the plurality of battery cells, wherein a first end of the respective clamping element is respectively connected to a first of the two end plates and a second end of the respective clamping element is respectively connected to a second of the two end plates. Here, these connections are preferably formed in a cohesive manner, such as in particular in a welded manner. A cohesive connection between the at least one clamping element and the end plates can advantageously transfer comparably high forces. At this point, it should be noted that a comparably low initial pre-stressing force can be formed by the compressing element owing to the pre-stressing or pre-pressing of the plurality of battery cells formed by means of the clamping element at the beginning of the service life. Here, the first temperature-control element is connected to the clamping element. In particular, this connection is formed in a thermally conductive and preferably mechanical manner.

An adhesive is particularly preferably arranged between a side surface of a battery cell and the clamping element. Here, the adhesive can furthermore have thermally conductive additives. Therefore, a situation where the adhesive is in the form of a thermally conductive adhesive is particularly preferred. In particular, said adhesive can be selected to be the same adhesive as that which forms a cohesive connection between the bottom surface of the housing of the battery module and the bottom surface of the battery cell. At this point, it should be noted that here the side surface of the battery cell is in each case arranged perpendicularly to the largest side surfaces of the battery cell. For production purposes, here, the adhesive can initially be applied either to the respective side surface of the battery cell or else to the clamping element. The connection formed in an adhesively bonded manner between a side surface of a battery cell and the clamping element advantageously forms a mechanical load path, as a result of which, overall, the adhesive connection between the bottom surface of the housing of the battery module and the bottom surface of a battery cell is subject to lower loads during operation of the battery module.

The supporting element is advantageously connected in a form-fitting or cohesive manner to an end plate or to the housing. This allows comparably simple production of the battery module.

The compressing element and/or the supporting element are/is particularly preferably formed from a polymeric material, such as in the form of a plastic injection-molded part for example. The polymeric material particularly preferably has a comparably low thermal conductivity, and therefore undesired secondary thermal paths can be minimized.

A respective spacer element is preferably arranged between two battery cells arranged adjacent to one another. In particular, the spacer element of this kind is accordingly arranged adjacent to the respectively largest side surfaces of the battery cells, between which the spacer element is arranged. Spacer elements of this kind can in particular prevent direct contact between the battery cells respectively arranged adjacent to one another and therefore form a defined spacing between the battery cells of this kind. As a result, thermal insulation and/or electrical insulation can be formed. Furthermore, a spacer element is arranged, in particular, between an end plate and a battery cell arranged at an end. This can prevent heat from being transferred between the end plate and the battery cell arranged directly adjacent to said end plate and at an end or this heat transfer can at least be considerably reduced.

Overall, an embodiment according to the invention of the battery module offers the advantage that the compressing element, in particular its two contact surfaces, makes/make mechanical contact with the housing and the plurality of battery cells or the respective end plate and that, opposite to this, the supporting element, in particular its two contact surfaces, makes/make mechanical contact with the housing and the plurality of battery cells or the respective end plate, as a result of which positioning and fixing of the plurality of battery cells in the housing is ensured both at the beginning of the service life (BoL for short) and at the end of the service life (EoL for short).

Heat is transferred from the plurality of battery cells, via the cohesive connection, to the bottom surface of the housing of the battery module and further to the second temperature-control element via what is known as a first primary thermal path during operation when removing heat from the plurality of battery cells. Such heat can include, in particular, heat from the battery cells produced during operation both at the beginning of the service life and at the end of the service life. In particular, heat should be removed from the plurality of battery cells via the first primary thermal path, in the case of which heat is transferred from the interior of the respective battery cell, via the cohesive connection and the bottom surface of the housing, further to the second temperature-control element. Therefore, the second temperature-control element serves, in principle, as a heat sink in this case.

Heat is transferred from the first temperature-control element, via the clamping element and in particular the connection formed in an adhesively bonded manner between the clamping element and the side surfaces of the battery cells, to the respective side surfaces of the battery cells, as a result of which said battery cells can be heated, via what is known as a second primary thermal path during operation when heating the plurality of battery cells. Therefore, the first temperature-control element serves, in principle, as a heat source in this case.

Heat is transferred from the plurality of battery cells, via the cohesive connection formed in an adhesively bonded manner, to the clamping element via what is known as a first secondary thermal path, which is undesired in principle, during operation when removing heat from the plurality of battery cells. Said heat is then further transferred to the end plates on account of the, for example, cohesive connection, which forms a thermally comparatively good connection, via the clamping element. Said heat can also be transferred from the end plates to the housing, for example, via the compressing element. Such heat can also include, in particular, heat from the battery cells produced during operation both at the beginning of the service life and at the end of the service life. A first secondary thermal path of this kind can lead to the battery cells arranged at an end transferring a comparably higher flow of heat to the housing, and as a result having heat removed from them more quickly, on account of the physical proximity to the end plates in comparison to battery cells arranged in a central position. As a result, an inhomogeneous temperature distribution could be formed. In this case, the compressing element can prevent said heat from being transferred further to the housing of the battery module, or can at least reduce said heat transfer. Therefore, overall, the first secondary thermal load path can be at least considerably reduced.

Heat is then further transferred to the end plates on account of the, for example, cohesive connection, which forms a thermally comparably good connection, via the clamping element further to the end plates via what is known as a second secondary thermal path, which is also undesired in principle, during operation when heating the plurality of battery cells by means of the first temperature-control element. Said heat can also be transferred from the end plates to the housing, for example, via the compressing element. A second secondary thermal path of this kind can lead to the battery cells arranged at an end obtaining a comparably lower flow of heat via the second primary thermal path, and as a result being heated more slowly, on account of the physical proximity to the end plates in comparison to battery cells arranged in a central position. As a result, an inhomogeneous temperature distribution could be formed and the speed at which, in particular, the battery cells arranged at an end heat up would be lower overall. In this case, the compressing element can prevent said heat from being transferred further to the housing of the battery module, or can at least reduce said heat transfer. Therefore, overall, the second secondary thermal load path can be at least considerably reduced.

Overall, an embodiment according to the invention of a battery module offers the advantage that the undesired first and second secondary thermal paths between the battery cells and the housing can be minimized both when removing heat from and when heating the plurality of battery cells, so that a non-uniform temperature distribution can be prevented as a result.

On account of the thermal insulation formed between the housing and the battery cell arranged at an end or the end plate, the first temperature-control element can additionally be formed with a lower temperature control capacity, such as a lower heating capacity for example.

In particular, the compressing element and the supporting element exert comparably lower pre-stressing forces on the plurality of battery cells at the beginning of the service life. During operation of the battery module, the swelling forces of the battery cells increase comparably sharply from the beginning of the service life to the end of the service life. In particular, the stresses within the cohesive connection between the battery cells arranged at an end and the housing increase comparably sharply. In order to reduce and thereby to limit stresses occurring within the cohesive connection, such as in particular within the connection formed in an adhesively bonded manner, between the bottom surface of the housing of the battery module and the bottom surface of the battery cells and also between the clamping element and the side surfaces of the battery cells, the compressing element and the supporting element are supported on the housing. As a result, overall, the mechanical load within the cohesive connection is reduced, in particular at the end of the service life, and failure of said cohesive connection is prevented, as a result of which the reliability of the battery module can be increased overall. In addition, the risk of adequate temperature control of the battery cells no longer being provided on account of failure of the cohesive connection can preferably be considerably reduced. Furthermore, as a result, the properties of the adhesive, such as its strength up to elongation at break for example, can be selected in a comparably larger range as a result. For example, a thermally conductive adhesive with relatively low strength values and better thermal conductivity could be selected.

In particular, the compressing element is arranged so as to make mechanical contact with the housing in such a way that a spacing is always formed between the housing and the end plate or the battery cell at an end. As a result, an air gap with a thermally insulating action is reliably formed.

It should further also be noted that both the compressing element and the supporting element could also be formed from a metal material, as a result of which even higher forces would be able to be transferred in particular. In this case, thermal insulation and/or electrical insulation should be provided in order to thermally and/or electrically insulate the plurality of battery cells from the housing of the battery module.

The present invention also relates to a method for producing a battery module as just described comprising a plurality of prismatic battery cells which are in particular in the form of lithium-ion battery cells and which are arranged next to one another in a longitudinal direction of the battery module. Furthermore, a first temperature-control element is thermally conductively connected to in each case one side surface of the plurality of battery cells. Here, the plurality of battery cells are received in an interior of a housing of the battery module and additionally a bottom surface of the housing of the battery module and a bottom surface of the battery cells are respectively cohesively connected to one another, in particular in an adhesively bonded manner by means of an adhesive. Here, the housing comprises a second temperature-control element directly adjacent to the bottom surfaces of the plurality of battery cells. Furthermore, a compressing element and/or a supporting element is arranged between the housing and the plurality of battery cells in the longitudinal direction of the battery module.

It is particularly preferred here when the plurality of battery cells are braced with one another, and preferably are arranged between two end plates, which are braced with one another by way of a clamping element in particular, as a result of which initial compression or pre-stressing can be formed at the beginning.

Furthermore, a supporting element is preferably arranged opposite the compressing element in the longitudinal direction of the plurality of battery cells.

It is expedient when, for producing the battery module, the plurality of battery cells preferably braced with one another are pushed, in particular together with the spacer elements arranged between adjacent battery cells, the two end plates and the at least one clamping element as an entire unit, in the direction of the supporting element until said supporting element makes contact with the housing and also before, for example, the thermally conductive adhesive cures. In other words, said elements or the entire unit are/is displaced on the adhesive. The compressing element is then inserted into the battery module until defined compression is formed. In particular, in this case, the compressing element can already be pre-fixed to the cell stack or else fixed only after the compressing element has been finally inserted. Owing to the arrangement of the compressing element, tolerances in the arrangement of the plurality of battery cells and/or the housing can be compensated for in this case.

BRIEF DESCRIPTION OF THE DRAWINGS

Exemplary embodiments of the invention are illustrated in the drawings and described in greater detail in the following description.

In the drawings.

DETAILED DESCRIPTION

Figure 1:
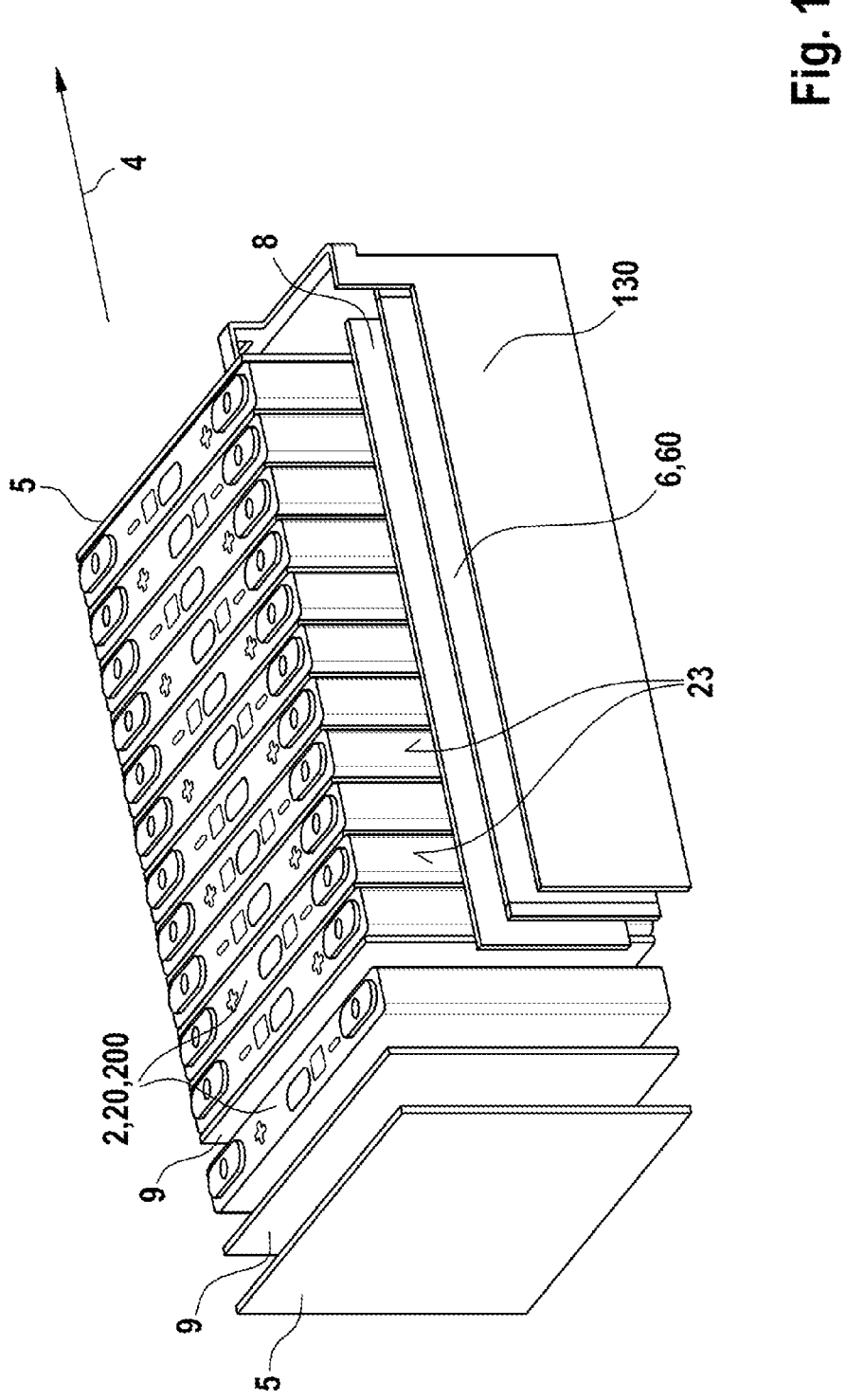
FIG. 1 shows an exploded illustration of a plurality of battery cells.

FIG. 1 shows an exploded illustration of a plurality of battery cells 2, preferably braced with one another, which are each in the form of prismatic battery cells 20. In particular, the battery cells 2 are preferably in the form of lithium-ion battery cells 200.

Figure 2:
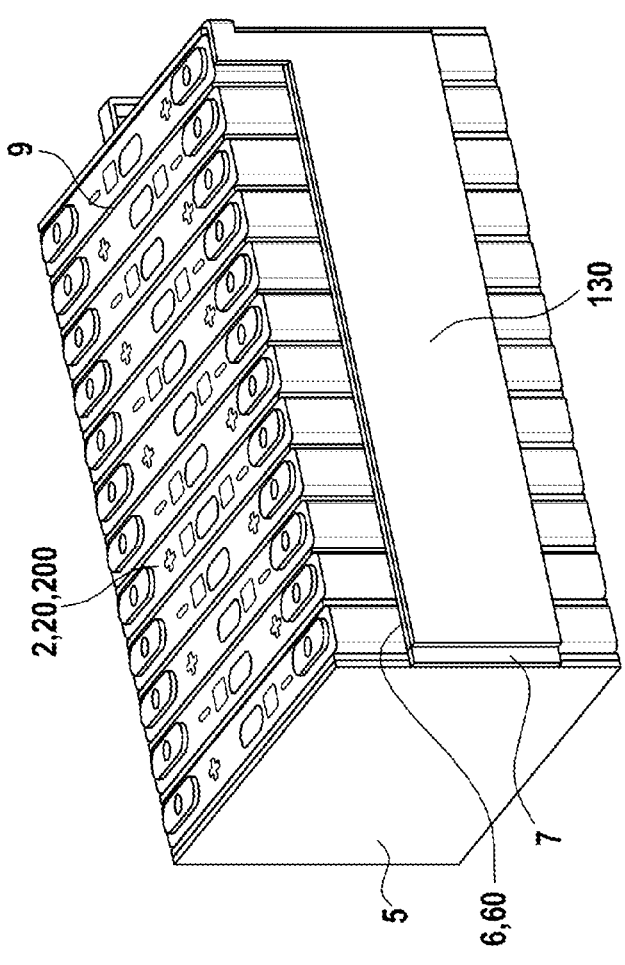
FIG. 2 shows a perspective view of the plurality of battery cells in accordance with FIG. 1.

FIG. 2 shows a perspective view of the plurality of battery cells 2, preferably braced with one another, in accordance with FIG. 1. Therefore, FIGS. 1 and 2 should be described together in the text which follows.

In said figures, the battery cells 2 are arranged next to one another in a longitudinal direction 4 of the battery module 1. In addition, the battery cells 2 are braced with one another.

Furthermore, said figure shows that the plurality of battery cells 2 are arranged between two end plates 5. Here, the two end plates 5 and the plurality of battery cells 2 are braced with one another by way of clamping elements 6. In particular, the clamping elements 6 are each in the form of a clamping band 60 here. In particular, FIG. 2 shows that the clamping element 6 is cohesively connected to the end plates 5, such as in particular in a welded manner by means of a welded connection 7.

An adhesive 8, which particularly preferably has thermally conductive additives, is arranged between the clamping element 6 and a side surface 23 of a battery cell 2.

In addition, a respective spacer element 9 is arranged between two battery cells 2 arranged adjacent to one another. A spacer element 9 is also arranged between an end plate 5 and a battery cell 2 arranged at an end.

In addition, said figure shows that a first temperature-control element 130 is thermally conductively connected to in each case one side surface 23 of the plurality of battery cells 2. In particular, the first temperature-control element 130 is arranged on the clamping element 6.

Figure 3:
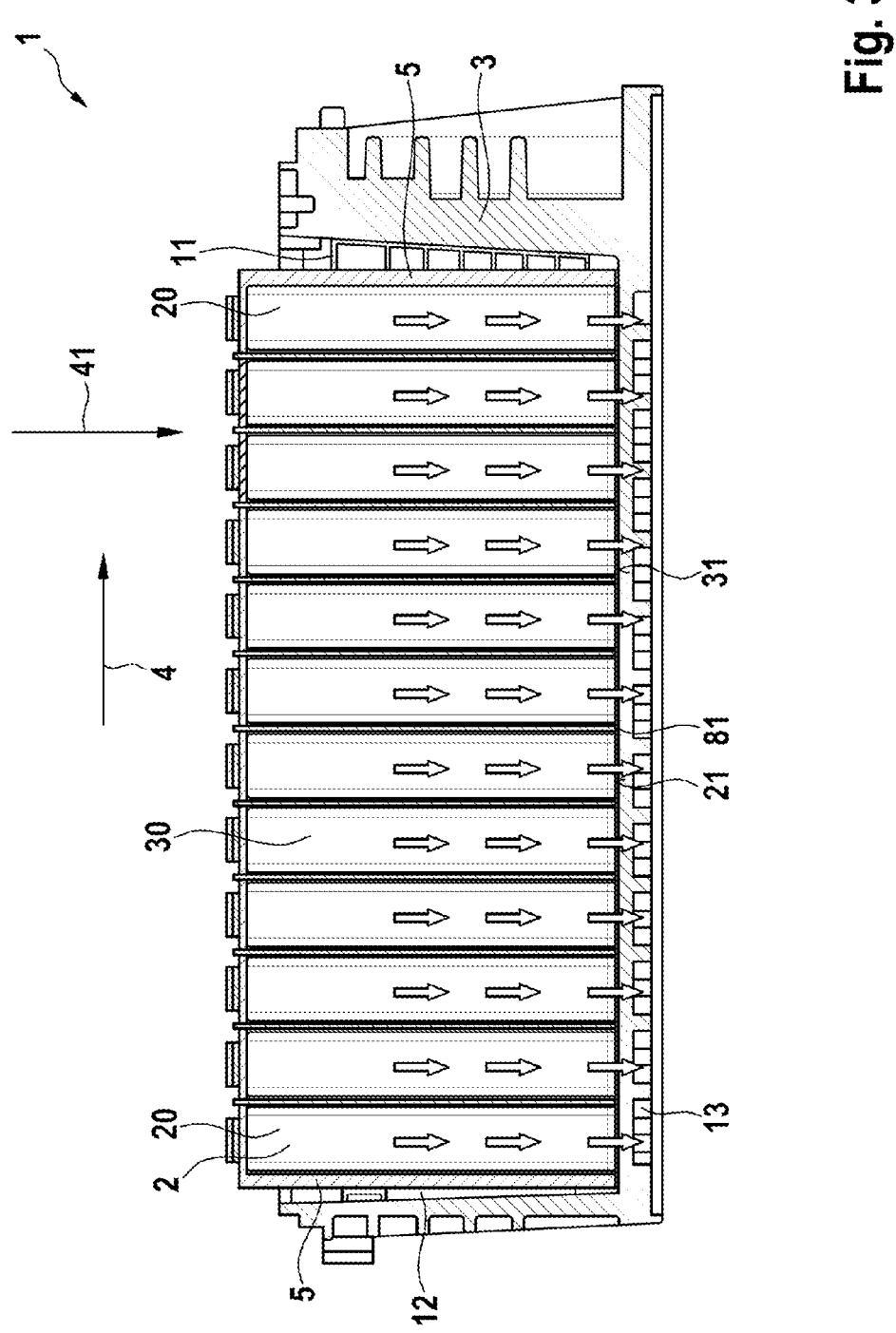
FIG. 3 shows a sectional view of an embodiment of a battery module according to the invention from the side.

FIG. 3 shows a sectional view of an embodiment of a battery module 1 according to the invention from the side. Said figure shows that the plurality of battery cells 2 are received in an interior 30 of a housing 3 of the battery module 1.

Furthermore, a bottom surface 31 of the housing 3 of the battery module 1 and a bottom surface 21 of the battery cells 2 are respectively cohesively connected to one another. In particular, this connection can be formed by means of an adhesive 81.

Here, the housing 3 of the battery module 1 comprises a second temperature-control element 13 directly adjacent to the bottom surfaces 21 of the battery cells 2.

A compressing element 11 is arranged between the housing 3 of the battery module 1 and the plurality of battery cells 2 in the longitudinal direction 4 of the battery module 1. Here, the compressing element 11 tapers perpendicularly to the longitudinal direction 4 of the battery module 1 in the direction of the bottom surface 31 of the housing 3 of the battery module 1. In particular, this taper is formed in a vertical direction 41, which is arranged perpendicularly to the longitudinal direction 4.

Furthermore, said figure shows that a supporting element 12 is arranged between the housing 3 of the battery module 1 and the plurality of battery cells 2 opposite the compressing element 11 in the longitudinal direction 4 of the battery module 1.

In addition, said figure shows battery cells 20 arranged at an end.

Furthermore, FIG. 3 shows the above-described primary thermal path, in which heat is transferred from the plurality of battery cells 2 to the bottom surface 31 of the housing 3 of the battery module 1 and then to the second temperature-control element 13 via the cohesive connection during operation.

Figure 4A:
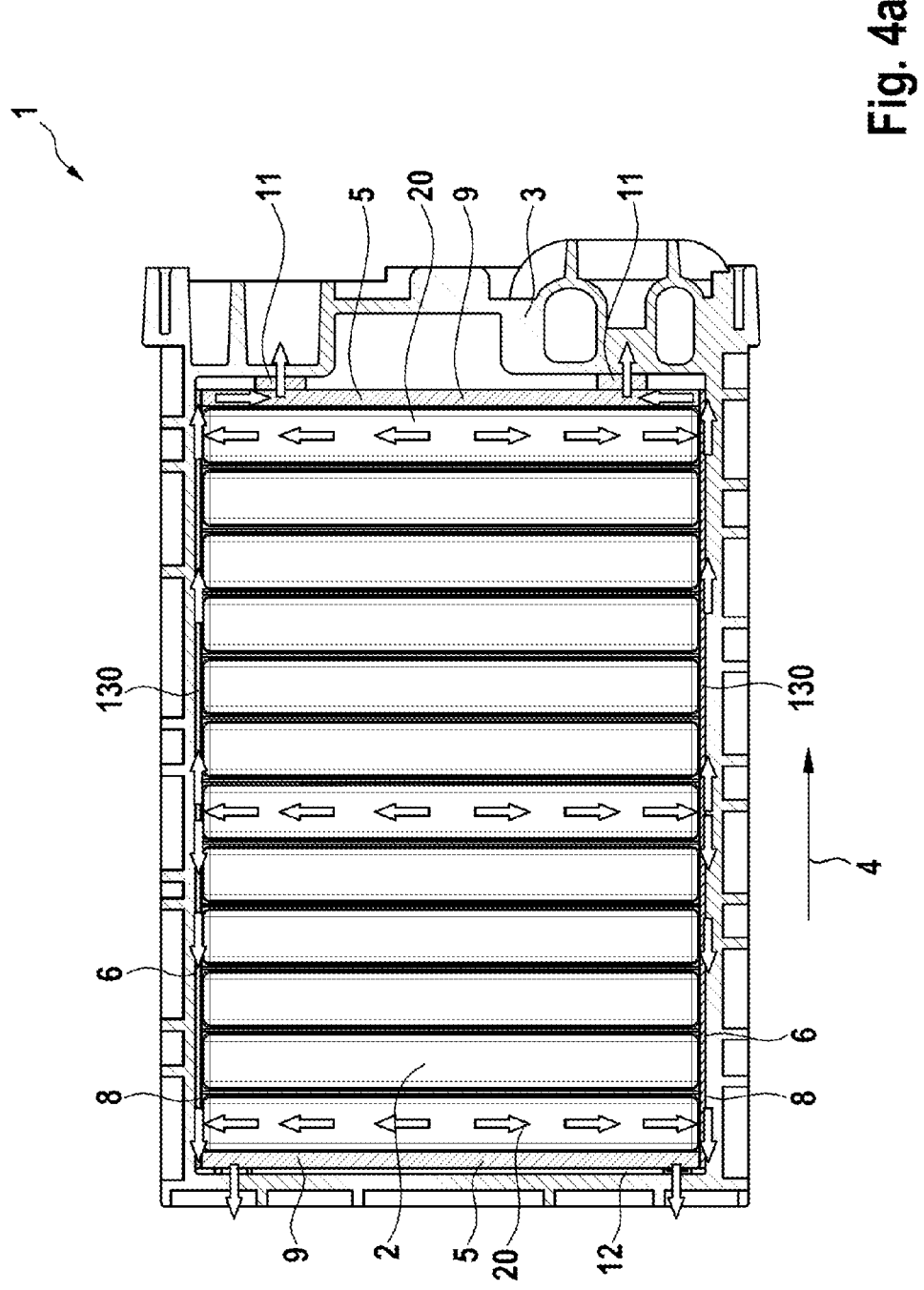
FIG. 4a shows a sectional view of the embodiment of the battery module according to the invention in accordance with FIG. 3 from above.

FIG. 4*a* shows a sectional view of the embodiment of the battery module 1 according to the invention in accordance with FIG. 3 from above.

FIG. 4*a* shows that the battery module 1 preferably has two compressing elements 11.

Furthermore, FIG. 4*a* shows the above-described first secondary thermal path, in which heat is transferred from the plurality of battery cells 2 to the clamping element 6 via the cohesive connection formed in an adhesively bonded manner during operation for the purpose of removing heat. Furthermore, said heat is transferred to the housing 3 of the battery module 1 via the end plates 5 and furthermore the compressing elements 11 or the supporting element 12.

In particular, said figure also shows the flow of heat from the battery cell 20 arranged at an end.

Figure 4B:
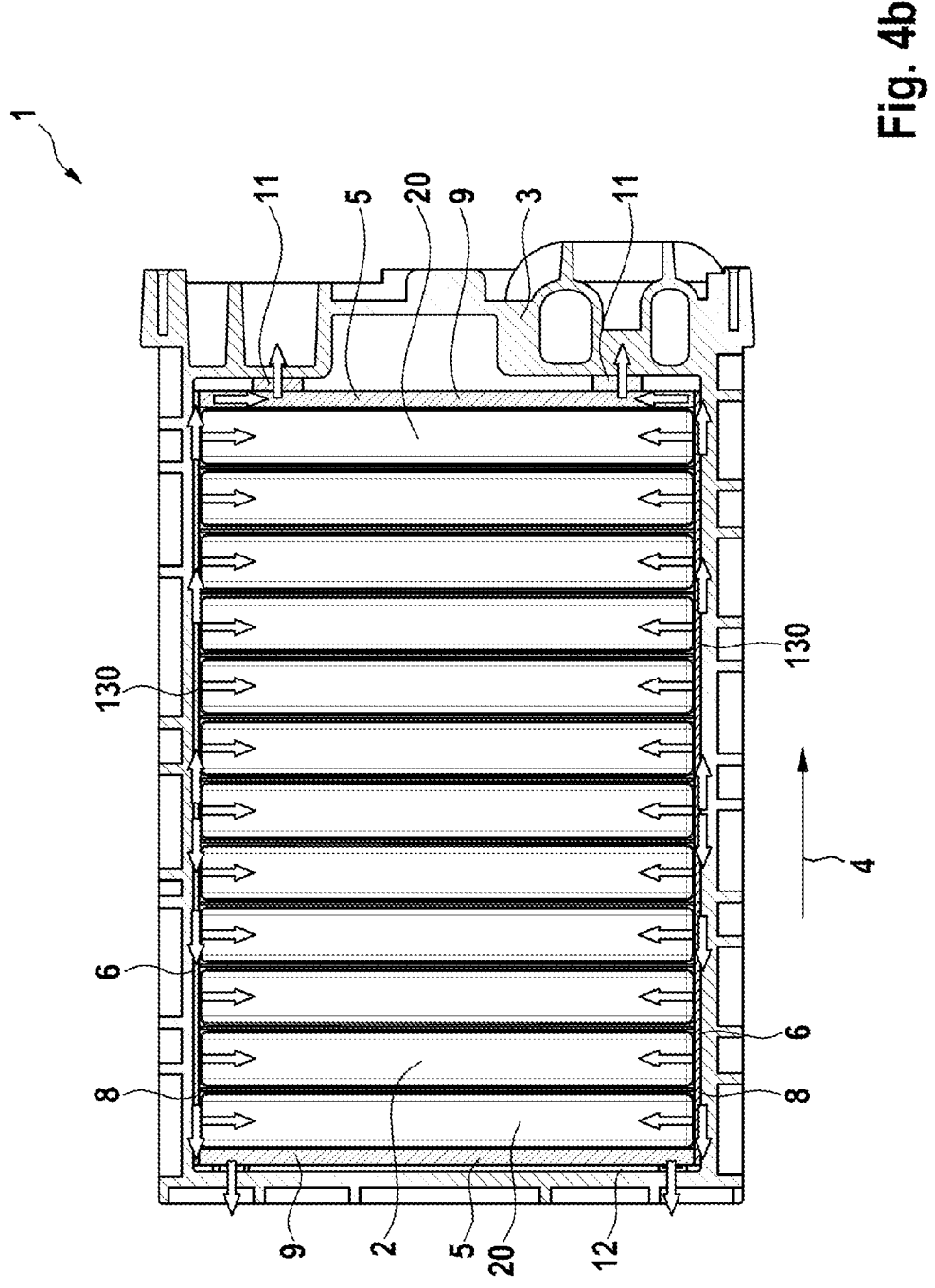
FIG. 4b shows a sectional view of the embodiment of the battery module according to the invention in accordance with FIG. 3 from above.

FIG. 4*b* shows a sectional view of the embodiment of the battery module 1 according to the invention in accordance with FIG. 3 from above.

FIG. 4*b* initially shows the above-described second primary thermal path, in which heat is transferred from the first temperature-control element 130 to the plurality of battery cells 2 via the clamping element 6 and the cohesive connection formed in an adhesively bonded manner during operation for heating purposes.

Furthermore, FIG. 4*b* shows, in contrast to FIG. 4*a*, the above-described second secondary thermal path, in which heat is transmitted from the plurality of battery cells 2 to the clamping element 6 via the cohesive connection formed in an adhesively bonded manner during operation for heating purposes. Furthermore, said heat is transferred to the housing 3 of the battery module 1 via the end plates 5 and furthermore the compressing elements 11 or the supporting element 12.

Figure 5:
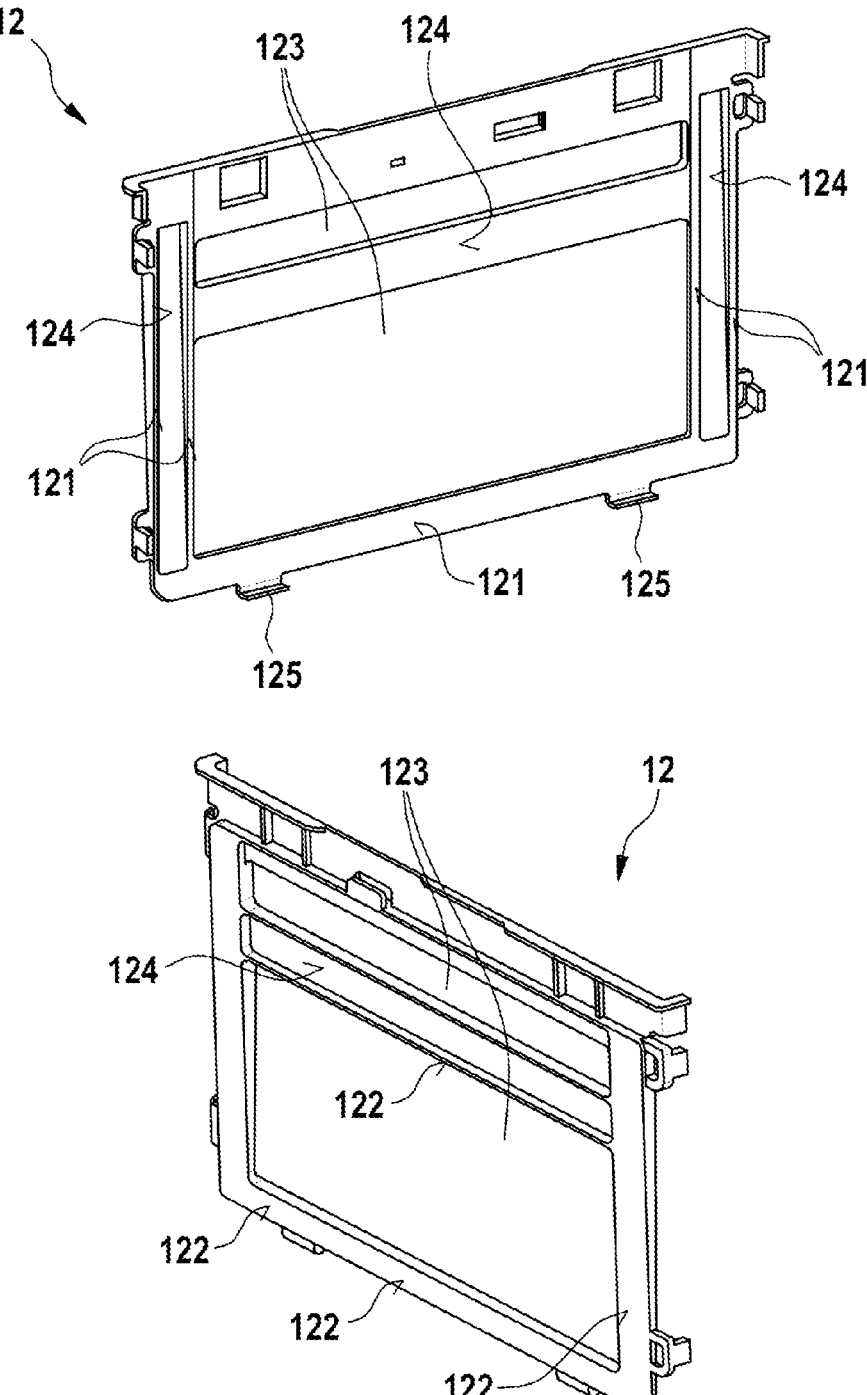
FIG. 5 shows an embodiment of a supporting element.

FIG. 5 shows an embodiment of a supporting element 12.

The left-hand-side illustration in said figure shows a first view with contact surfaces 121, which are formed to make mechanical contact with the end plates 5. Furthermore, the right-hand-side illustration shows a second view with contact surfaces 122, which are formed to make mechanical contact with the housing 3 of the battery module 1.

Furthermore, the supporting element 12 has at least one opening 123. Said opening 123 serves to ensure thermal decoupling. This has the advantage that thermal insulation can be achieved owing to the resulting air gap between the end plate 5 and the housing 3.

The supporting element 12 further has respectively recessed surfaces 124 which reliably form a spacing both from the end plate 5 and from the housing 3 and as a result ensure thermal decoupling. Here, the recessed surfaces 124 can be configured in any desired manner, for example can comprise a curve shape. Furthermore, said figure shows that the contact surface 121 and the contact surface 122 are arranged offset in relation to one another, and therefore the flow of heat within the supporting element 12 is deflected and in this way has to cover a longer distance, as a result of which the thermal resistance of the supporting element 12 is considerably increased.

Overall, the contact area between the spacer element 12 and the housing 3 and also between the spacer element 12 and the end plate 5 is reduced to a minimum in such a way that mechanical forces can still be reliably transferred and at the same time good thermal insulation is formed between the housing 3 and the respective end plate 5.

The supporting element 12 further comprises at least one contact surface 125, which is formed on a lower side of the supporting element 12, in order to make contact with the bottom surface 31 of the housing 3. This contact area 125 is also reduced.

At this point, it should be noted that the supporting element 12 is preferably formed from a polymeric material. A supporting element of this kind has, overall, a very low thermal conductivity and can have a thermally insulating action as a result. In particular, a high thermal resistance can be formed in conjunction with the spacer surfaces 121, 122 arranged in an offset manner.

Figure 6:
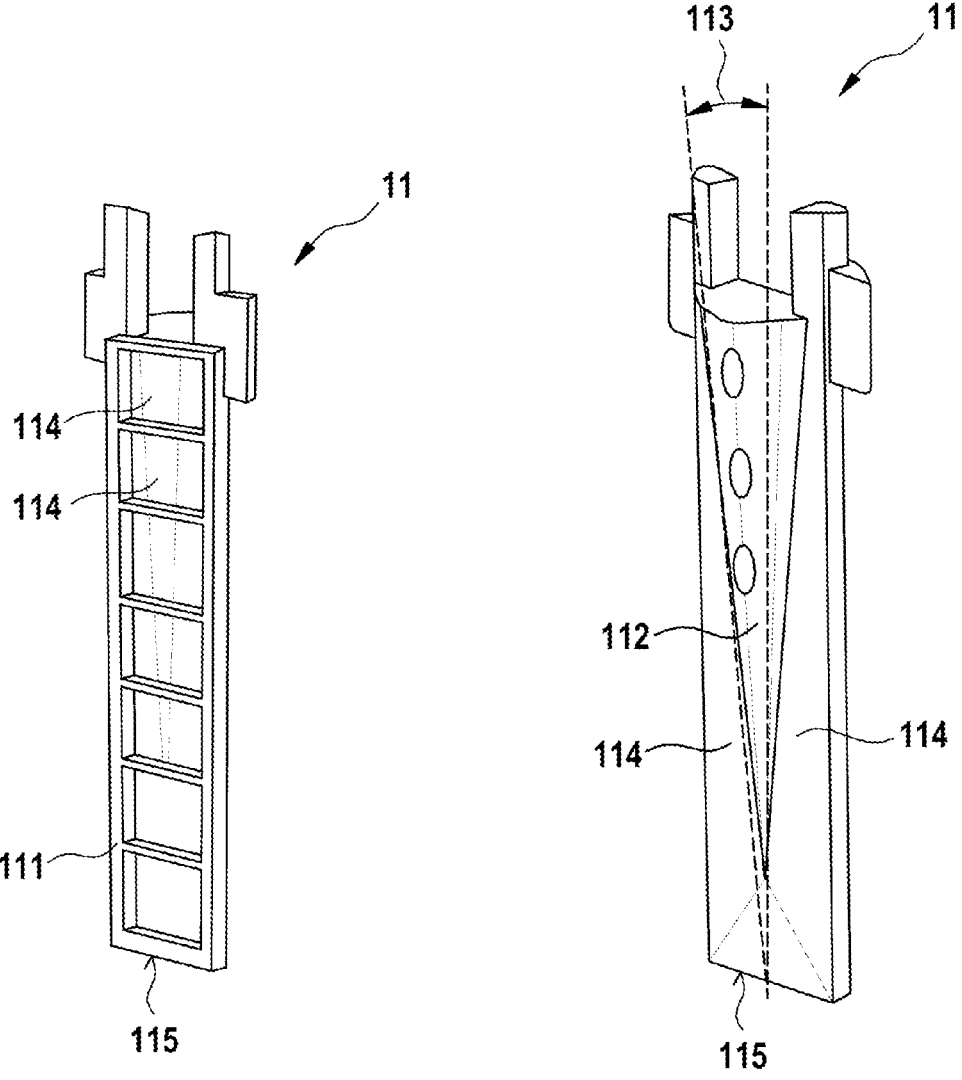
FIG. 6 shows an embodiment of a compressing element.

FIG. 6 shows an embodiment of a compressing element 11.

The left-hand-side illustration of said figure shows a first view with a first contact surface 111 which is formed to make mechanical contact with the end plates 5. Furthermore, the right-hand side illustration shows a second view with a second contact surface 112 which is formed to make mechanical contact with the housing 3 of the battery module 1. In particular, the second contact surface 112 is in the form of a linear contact here.

Said figure shows that the first contact surface 111 and the second contact surface 112 are arranged at an angle 113 with respect to one another, wherein the angle has, in particular, a value of at least four degrees.

The compressing element 11 further has respectively offset surfaces 114 which reliably form a spacing both from the end plate 5 and from the housing 3 and as a result ensure thermal decoupling. Here, the recessed surfaces 114 can be configured in any desired manner, for example can comprise a curve shape. Furthermore, said figure shows that the contact surface 111 and the contact surface 112 are arranged offset in relation to one another, and therefore the flow of heat within the compressing element 11 is deflected and in this way has to cover a longer distance, as a result of which the thermal resistance of the compressing element 11 is considerably increased.

Overall, the contact area between the compressing element 11 and the housing 3 and also between the compressing element 11 and the end plate 5 is reduced to a minimum in such a way that mechanical forces can still be reliably transferred and at the same time thermal insulation is formed between the housing 3 and the respective end plate 5.

The pressing element 11 further comprises a contact surface 115, which is formed on a lower side of the supporting element 12, in order to make contact with the bottom surface 31 of the housing 3. This contact area is also reduced.

At this point, it should be noted that the compressing element 11 is preferably formed from a polymeric material. A compressing element of this kind has, overall, a very low thermal conductivity and can have a thermally insulating action as a result. In particular, a high thermal resistance can be formed in conjunction with the spacer surfaces 111, 112 arranged in an offset manner.

Figure 7:
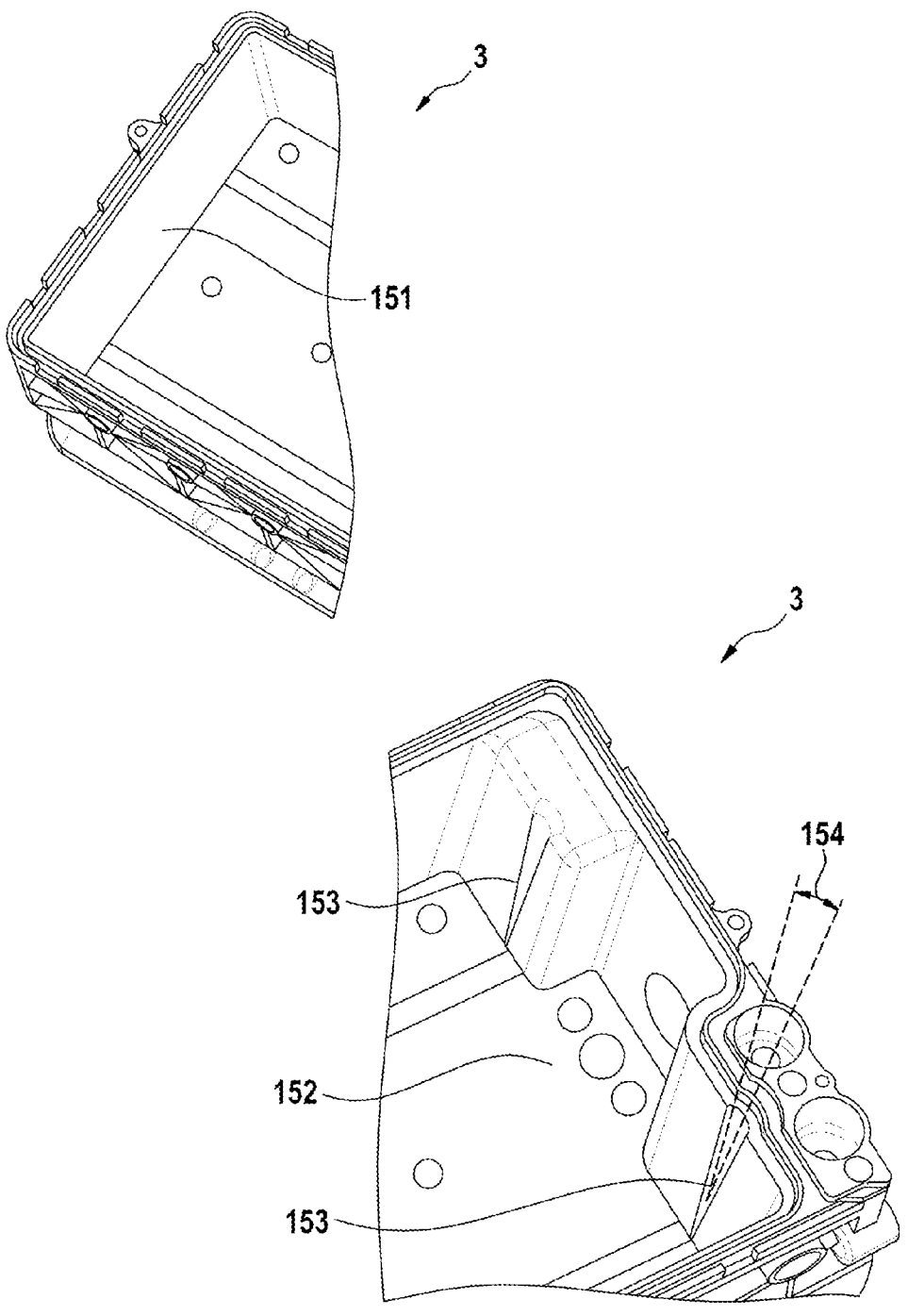
FIG. 7 shows an embodiment of a housing of the battery module.

FIG. 7 shows an embodiment of a housing 3 of the battery module 1.

The left-hand-side illustration in said figure shows the inner side 151 of the housing 3 of the battery module 1, on which inner side the supporting element 12 is arranged.

The right-hand-side illustration in said figure shows the inner side 152 of the housing 3 of the battery module 1, on which inner side the compressing element 11 is arranged or the compressing elements 11 are arranged.

Said figure shows that the housing 3 of the battery module 1 comprises receptacles 153 in which a respective compressing element 11 can be received in a form-fitting manner. In particular, the receptacles 153 in this case are in the form of guide grooves in which the linear contact of the compressing element 11 can preferably be received. That is to say, linear or in other words very narrow contact is formed between the receptacle 153 and the compressing element 11.

Furthermore, a receptacle 153 can also form an angle 154 which is formed with respect to a vertical direction 41 of the battery module 1 arranged perpendicularly to the longitudinal direction 4 of the battery module 1 and has a value of at least four degrees.

What is claimed is:

1. A battery module comprising:
   a housing (3) defining a housing interior (30);
   a plurality of prismatic battery cells (2, 20) that are arranged next to one another in the housing interior (30) in a longitudinal direction (4) of the battery module (1);
   a first temperature-control element (130) in the form of an electric heater is positioned between a wall of the housing (3) and the plurality of battery cells (2), the first temperature-control element (130) extending along the longitudinal direction (4) from a first end of the battery module to a second end of the battery module, and the first temperature control element (130) being thermally conductively connected to one side surface (23) of each of the plurality of battery cells (2) that is facing the wall of the housing;
   a bottom surface (31) of the housing (3) and a bottom surface (21) of the battery cells (2) are respectively cohesively connected to one another, and the housing (3) comprises a second temperature-control element (13) directly adjacent to the bottom surfaces (21) of the plurality of battery cells (2); and
   a compressing element (11) and a supporting element (12), which is separate and different from the compressing element (11), are arranged between the housing (3) and the plurality of battery cells (2) in the longitudinal direction (4) of the battery module (1), wherein the supporting element (12) is arranged between the housing (3) and a first end battery cell (2) of the plurality of battery cells (2) at a first distal end of the plurality of battery cells, and the compressing element (11) is arranged between the housing (3) and a second end battery cell (2) of the plurality of battery cells (2) at a second distal end of the plurality of battery cells opposite the supporting element (12) in the longitudinal direction (4) of the battery module (1), wherein the compressing element (11) defines a contact surface that is received in a form-fitting manner in a receptacle (153) of the housing (3) of the battery module (1), wherein the receptacle (153) forms an angle (154) of at least four degrees with respect to a vertical direction (41) of the battery module (1) arranged perpendicularly to the longitudinal direction (4), and wherein the receptacle (153) is formed as a recess contained within a second wall of the housing; and
   wherein the supporting element (12) comprises an opening (123) and contact surfaces (121, 122).

2. The battery module according to claim 1, wherein the compressing element (11) tapers perpendicularly to the longitudinal direction (4) of the battery module (1) in a direction of the bottom surface (31) of the housing (3) and the compressing element (11) has two contact surfaces (111, 112) that are arranged at an angle (113) of at least four degrees with respect to one another.

3. The battery module according to claim 1, wherein the compressing element (11) is received in a form-fitting manner in a receptacle (153) of the housing (3) of the battery module (1), wherein the receptacle (153) forms an angle (154) of at least four degrees with respect to a vertical direction (41) of the battery module (1) arranged perpendicularly to the longitudinal direction (4).

4. The battery module according to claim 1, wherein the battery module (1) has two compressing elements (11).

5. The battery module according to claim 1, wherein the second temperature-control element (13) is in the form of a temperature-control chamber through which temperature-control fluid can flow.

6. The battery module according to claim 1, wherein the plurality of battery cells (2) are braced with one another.

7. The battery module according to claim 6, wherein the plurality of battery cells (2) are arranged between two end plates (5) which are braced with one another by way of at least one clamping element (6), and the first temperature-control element (130) is connected to the clamping element (6).

8. The battery module according to claim 7, wherein an adhesive (8) is arranged between a side surface (23) of a battery cell (2) and the clamping element (6).

9. The battery module according to claim 3, wherein the supporting element (12) is connected in a form-fitting or cohesive manner to an end plate (5) or to the housing (3).

10. The battery module according to claim 1, wherein the compressing element (11) and/or the supporting element (12) is formed from a polymeric material.

11. The battery module according to claim 1, wherein a respective spacer element (9) is arranged between two battery cells (2) arranged adjacent to one another and a spacer element (9) is arranged between an end plate (5) and the first end battery cell (2).

12. The battery module according to claim 1, wherein the battery cells (2, 20) are lithium-ion battery cells (200).

13. The battery module according to claim 1, wherein the bottom surface (31) of the housing (3) of the battery module (1) and the bottom surface (21) of the battery cells (2) are respectively cohesively connected to one another in an adhesively bonded manner by an adhesive.

14. The battery module according to claim 7, wherein the at least one clamping element (6) is a clamping band (60), and the first temperature-control element (130) is thermally conductively and mechanically connected to the clamping band (60), wherein the at least one clamping band (60) is cohesively connected to the end plates (5) in a welded manner.

15. The battery module according to claim 8, wherein the adhesive (8) has thermally conductive additives.

16. A battery module comprising:
a housing (3) defining a housing interior (30);
a plurality of prismatic battery cells (2, 20) that are arranged next to one another in the housing interior (30) in a longitudinal direction (4) of the battery module (1);
a first temperature-control element (130) positioned between a first wall of the housing (3) and the plurality of battery cells (2), the first temperature-control element (130) extending along the longitudinal direction (4) from a first end of the battery module to a second end of the battery module, and the first temperature control element (130) being thermally conductively connected to one side surface (23) of each of the plurality of battery cells (2) that is facing the first wall of the housing;
a bottom surface (31) of the housing (3) and a bottom surface (21) of the battery cells (2) are respectively cohesively connected to one another, and the housing (3) comprises a second temperature-control element (13) directly adjacent to the bottom surfaces (21) of the plurality of battery cells (2); and
a compressing element (11) and a supporting element (12) are arranged between the housing (3) and the plurality of battery cells (2) in the longitudinal direction (4) of the battery module (1), and wherein the compressing element (11) defines a contact surface that is received in a form-fitting manner in a receptacle (153) of the housing (3) of the battery module (1), wherein the receptacle (153) forms an angle (154) of at least four degrees with respect to a vertical direction (41) of the battery module (1) arranged perpendicularly to the longitudinal direction (4), and wherein the receptacle (153) is formed as a recess contained within a second wall of the housing.

* * * * *